Aug. 4, 1931.                N. H. ABRAMS                1,816,818
                            WATER METER COVER
                            Filed Sept. 30, 1929
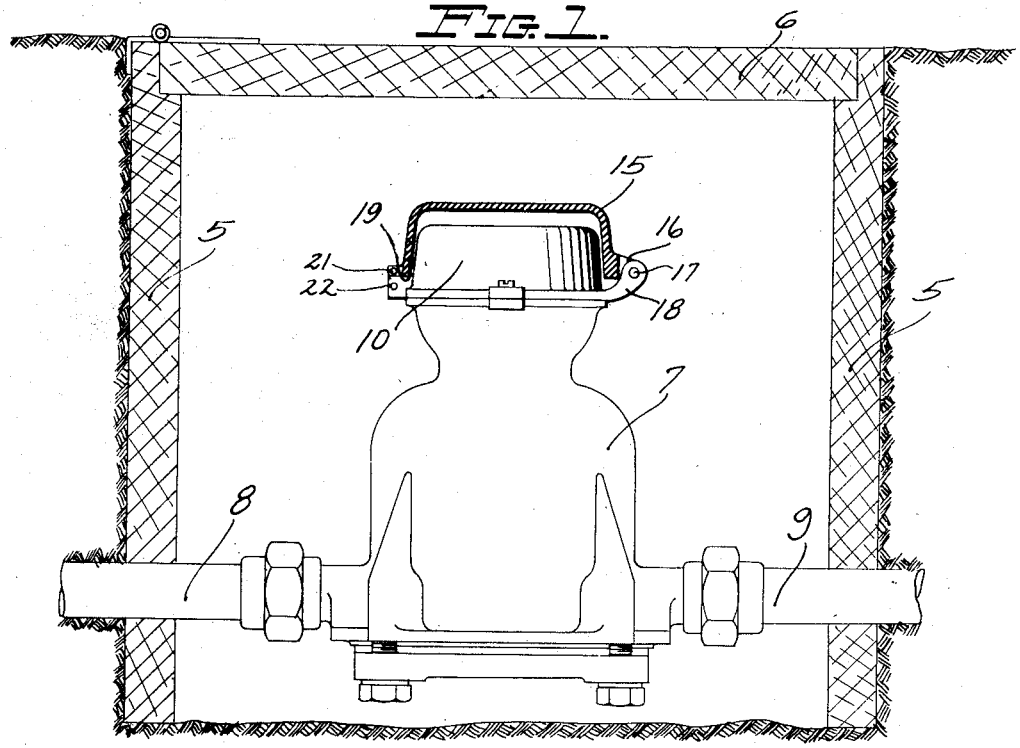
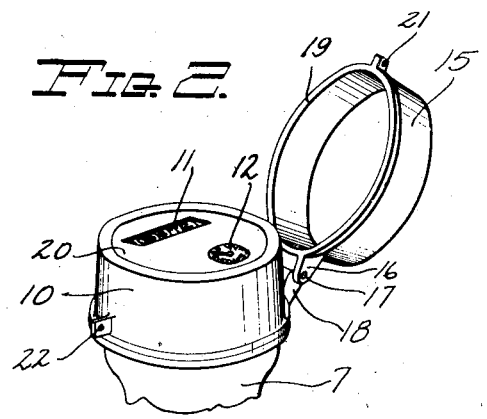
Inventor
Norman H. Abrams
By Wheeler, Wheeler & Wheeler
                        Attorneys Patented Aug. 4, 1931

1,816,818

UNITED STATES PATENT OFFICE

NORMAN H. ABRAMS, OF WACO, TEXAS, ASSIGNOR TO BADGER METER MANUFACTURING COMPANY, OF MILWAUKEE, WISCONSIN, A CORPORATION OF WISCONSIN

WATER METER COVER

Application filed September 30, 1929. Serial No. 396,235.

This invention relates to improvements in water meter covers.

It is the object of the invention to provide a cover which will remedy existing conditions with respect to visibility of the meter dials. In many installations, of which that shown in the drawing is representative, water meters become submerged. It has been customary to employ a glass over the dials to protect the dials and gears from the water and particularly from foreign matter generally carried thereby. There is frequently leakage about such glasses, however, and silt accumulates about the dials. Furthermore, regardless of leakage, the cover glass tends to accumulate upon its under surface a mist of condensed water vapor which cannot be wiped away by the meter reader and which renders it impossible to read the dials.

Obviously it would be possible to protect the dials by means of some cap which might be screwed into place upon water-tight packing, but such an expedient would require a considerable expenditure of time by the meter reader to expose the dials. The present invention seeks to protect the mechanism by means of a cap which is merely hinged to the meter casing with no provision whatever for water-tight connection thereto, the protection of the mechanism being made dependent upon the design of the cap as an air trap whereby the air within the cap will exclude water from the mechanism at any depth to which the meter may resonably be submerged.

In the drawings:

Figure 1 shows in cross section a meter pit in which a meter of conventional design is illustrated in elevation, the meter cap, to which this invention particularly relates, being illustrated in section.

Figure 2 is a perspective detail of the gear casing and dials of the top of a meter as they appear when exposed by the hinged lifting movement of the meter cap.

Like parts are identified by the same reference characters throughout the several views.

It will be understood that the box 5 with hinged cover 6 at the level of the ground is intended merely as an example of one form of meter installation in which the meter is subject to submersion by surface water. The meter casing 7 is connected in the customary way in a line including pipes 8 and 9. The assembly includes the usual gear casing 10 within which are housed the gear train and indicating dials shown at 11 and 12 in Fig. 2. It will be noted that no glass is required in the practice of this invention, since the mechanism within the gear case 10 of the meter housing is completely protected by the hinged cover 15.

The cover 15 is in the form of a cup of relatively deep section. It has laterally projecting ears 16 which receive a pintle 17 passing through the gears 18 of the meter housing. The arrangement is such that the margin 19 of the inverted cup-shaped cover or meter cap 15, is unbroken.

The only point at which foreign matter can enter the mechanism of the meter is at its upper face 20. Consequently, the design of the gear casing 10 is such as to bring its upper margin closely adjacent to the top of cap 15 in the closed position of the cap. In other words, the face 20 is well above the highest point at which the interior of cap 15 communicates with the exterior atmosphere. It is the function of the inverted cup-shaped cap 15 to entrap air when the assembly is submerged in water, and obviously, if cap 15 has an irregular margin or is apertured or otherwise placed in communication with the outer air, its effective capacity for the entrapment of air will consist only of that portion of it which is above the horizontal plane at which exterior communication is afforded. It is for this reason that the margin 19 has been described as preferably continuous and the cap has been described as preferably imperforate.

Because of the unusual depth of the cap 15, it has been necessary to provide an unusual offset in its hinge in order to permit the cap to move freely about pintle 17 to and from closed position. The depth of the cap may vary according to circumstances. The depth is such that at any water level above the meter to which the meter may be subject, the pressure of the superimposed water will not be sufficient to compress the air trapped in cap 15 to the point where the water level within the cap can equal the height of face 20 of the meter.

The buoyancy of air within cap 15 will ordinarily be overcome by the weight of the cap. Passages are provided, however, at 21 and 22 through which the wire of the seal may be passed or in which a padlock may be used, not merely for the customary protection against tampering, but also for the purpose of overcoming buoyancy, if any.

It will be obvious that with a meter face protected by an inverted cup of adequate capacity as herein disclosed, the parts will not only be protected against intrusion of foreign matter but, by the elimination of any need for a glass cover, there can be no deposits of mist or water of condensation which can in any way interfere with the reading of the meter.

I claim:

1. The combination with a meter having a transparent dial observing portion, of a cap in the form of an inverted cup embracing said dial observing portion and extending imperforate to a depth beneath the surface of said dial observing portion sufficient to exclude water from the surface of said dial observing portion by the air trapped within said cap.

2. The combination with a dial case at the upper face of which its dials are visible, of a cap for said case in the form of an inverted cup extending imperforate to a point adjacent the bottom of said case, and means hingedly connecting said cap with said case, the elevation of the face of said case within said cap being such that water will be excluded from said face by air entrapped within said cap.

3. The combination with a housing including an upwardly projecting gear case having an upwardly exposed transparent face, of a cap hinged to said gear case and comprising a member in the form of an inverted cup extending downwardly about said gear case to a point adjacent the bottom thereof, the hinged connection between said case and cap including an offset pintle, and the extent of projection of said cap below the face of said case being adapted to exclude water therefrom by the pressure of air entrapped within the cap.

NORMAN H. ABRAMS.